United States Patent
Li et al.

(10) Patent No.: US 12,248,780 B2
(45) Date of Patent: Mar. 11, 2025

(54) CONTINUOUS INTEGRATION AND CONTINUOUS DELIVERY PIPELINE FOR LOW CODE AND NO CODE APPLICATION PLATFORM

(71) Applicant: SAP SE, Walldorf (DE)

(72) Inventors: Jian Li, Singapore (SG); Yan Zang, Singapore (SG); Sheng Yao, Singapore (SG); Qiu Shi Wang, Singapore (SG)

(73) Assignee: SAP SE, Walldorf (DE)

( * ) Notice: Subject to any disclaimer, the term of this patent is extended or adjusted under 35 U.S.C. 154(b) by 167 days.

(21) Appl. No.: 18/328,001

(22) Filed: Jun. 2, 2023

(65) Prior Publication Data

US 2024/0403035 A1 Dec. 5, 2024

(51) Int. Cl.
| | |
|---|---|
| *G06F 40/47* | (2020.01) |
| *G06F 8/20* | (2018.01) |
| *G06F 8/34* | (2018.01) |
| *G06F 8/60* | (2018.01) |
| *G06F 8/71* | (2018.01) |
| *G06F 9/445* | (2018.01) |
| *G06F 9/50* | (2006.01) |
| *H04L 12/911* | (2013.01) |

(52) U.S. Cl.
CPC ............ *G06F 8/71* (2013.01); *G06F 8/34* (2013.01); *G06F 8/60* (2013.01)

(58) Field of Classification Search
CPC ..... G06F 8/71; G06F 8/34; G06F 8/60; G06F 8/77; G06F 8/61; G06F 9/5077; G06F 9/5072; G06F 9/5088; G06F 9/445; G06F 9/5027; G06F 8/63; G06F 9/44526; G06F 8/65; H04L 67/10; H04L 67/02; H04L 67/34

See application file for complete search history.

(56) References Cited

U.S. PATENT DOCUMENTS

| | | | |
|---|---|---|---|
| 9,825,881 B2 * | 11/2017 | Johnston | G06F 8/65 |
| 10,972,404 B2 * | 4/2021 | Pathak | H04L 47/72 |
| 11,726,748 B2 * | 8/2023 | Viswanathan | G06F 40/47 717/105 |

* cited by examiner

*Primary Examiner* — Thuy Dao
(74) *Attorney, Agent, or Firm* — Fish & Richardson P.C.

(57) ABSTRACT

Methods, systems, and computer-readable storage media for receiving, through a set of user interfaces (UIs), user input including job configuration information and deployment information for an application, providing a CI/CD job for the application with a CI/CD service using the job configuration information and the deployment information, and triggering, in response to a commit of changes to the application in a repository, automated build of the application, and in response, automatically: generating a development descriptor file at least partially based on the user input, providing an archive file including the development descriptor file, and processing, by the CI/CD job executed by the CI/CD service, the archive file to deploy the application within the target environment.

20 Claims, 11 Drawing Sheets

```
_schema-version: '3.1'
ID: test1
version: 1.0.0
description: A simple CAP project.
parameters:
  enable-parallel-deployments: true
build-parameters:
  before-all:
    - builder: custom
      commands:
        - rm -rf build/ui-deployer
        - mkdir -p build/ui-deployer
        - rm -rf build/dist
        - mkdir -p build/dist
    - builder: custom
      commands:
        - npm install --production
        - >-
          bash -c "cds -v | grep 'cds-dk' || npm i --production --no-save
          @sap/cds-dk @sap/mdk-tools"
        - bash -c "export PATH=$PATH:$(pwd)/node_modules/.bin"
        - cds build --production

```
...
modules:
  - name: test1-MDKApp
    type: html5
    path: app/MDKApp
    build-parameters:
      builder: custom
      commands:
        - mdk build --target module --ui5 --forceUpdate
        - bash -c "cd Web/MDKModule && rm -rf .npmrc && npm install"
        - bash -c "cd Web/MDKModule && npm run build"
        - >-
          bash -c "mv Web/MDKModule/MDKModule-content.zip
          ../../build/dist/MDKApp.zip"
        - rm -rf Web/MDKModule/dist
      _artifactName: MDKApp.zip
      supported-platforms: []
      build-result: ../../build/dist
  - name: test1-db-deployer
    type: hdb
    path: gen/db
    parameters:
      buildpack: nodejs_buildpack
    build-parameters:
      builder: npm
      ignore:
        - node_modules
        - package-lock.json
    requires:
      - name: test1-service-uaa
      - name: test1-service-db
  - name: test1-srv
    type: nodejs
    path: gen/srv
    parameters:
      memory: 256MB
    provides:
      - name: srv-api
        properties:
          srv-url: ${default-url}
    build-parameters:
      builder: npm
      ignore:
        - node_modules
        - package-lock.json

```
...
requires:
    - name: test1-service-uaa
    - name: test1-service-db
    - name: test1-service-destination
    - name: test1-service-metadata
    - name: test1-service-connectivity
    - name: test1-service-logs
- name: test1-aux-destinations
  type: com.sap.application.content
  parameters:
    content:
      subaccount:
        existing_destinations_policy: update
        destinations:
          - Authentication: OAuth2UserTokenExchange
            Name: test1-service-uaa
            ServiceInstanceName: test1-uaa
            ServiceKeyName: test1-uaa-key
            sap.cloud.service: lcap.test1
          - Authentication: OAuth2UserTokenExchange
            Name: test1-app-srv
            TokenServiceInstanceName: test1-uaa
            TokenServiceKeyName: test1-uaa-key
            URL: ~{srv-api/srv-url}
            sap.cloud.service: lcap.test1
          - Name: test1-service-html5-apps-repo-host
            ServiceInstanceName: test1-html5-apps-repo-host
            ServiceKeyName: test1-html5-apps-repo-host-key
            sap.cloud.service: lcap.test1
  build-parameters:
    no-source: true
  requires:
    - name: test1-service-uaa
      parameters:
        service-key:
          name: test1-uaa-key
    - name: srv-api
    - name: test1-service-html5-apps-repo-host
      parameters:
        service-key:
          name: test1-html5-apps-repo-host-key
    - name: test1-service-destination
      parameters:
        content-target: true

```
...
- name: test1-launchpad
    type: html5
    path: build/launchpad
    build-parameters:
      builder: custom
      commands:
        - npm install
        - >-
          npx -p @ui5/cli ui5 build --dest dist
          --include-task=generateManifestBundle
          --include-task=generateCachebusterInfo
        - bash -c "cd dist && npx bestzip ../../../build/dist/launchpad.zip *"
        - rm -rf dist
      _artifactName: launchpad.zip
      supported-platforms: []
      build-result: ../../build/dist
- name: test1-aux-ui-deployer
    type: com.sap.application.content
    path: build/ui-deployer
    build-parameters:
      build-result: resources
      requires:
        - name: test1-MDKApp
          artifacts:
            - MDKApp.zip
          target-path: resources
        - name: test1-launchpad
          artifacts:
            - launchpad.zip
          target-path: resources
    requires:
      - name: test1-service-html5-apps-repo-host
        parameters:
          content-target: true
...
```

*FIG. 3D*

```
...
resources:
  - type: org.cloudfoundry.managed-service
    name: test1-service-uaa
    parameters:
      service: xsuaa
      service-plan: application
      service-name: test1-uaa
      path: xs-security.json
      config:
        xsappname: test1-${space}
        role-collections:
          - description: PersonalDataManager
            name: test1-PersonalDataManager-${space}
            role-template-references:
              - $XSAPPNAME.PersonalDataManager
  - type: org.cloudfoundry.managed-service
    name: test1-service-db
    parameters:
      service: hana
      service-plan: hdi-shared
      service-name: test1-db
  - type: org.cloudfoundry.managed-service
    name: test1-service-destination
    parameters:
      service: destination
      service-plan: lite
      service-name: test1-destination
      config:
        HTML5Runtime_enabled: true
        version: 1.0.0
  - type: org.cloudfoundry.user-provided-service
    name: test1-service-metadata
    parameters:
      service: metadata
      service-plan: standard
      service-name: test1-metadata
      config:
        default-domain: ${default-domain}
  - type: org.cloudfoundry.managed-service
    name: test1-service-connectivity
    parameters:
      service: connectivity
      service-plan: lite
      service-name: test1-connectivity
...
```

*FIG. 3E*

```
...
- type: org.cloudfoundry.managed-service
  name: test1-service-logs
  parameters:
    service: application-logs
    service-plan: lite
    service-name: test1-logs
- type: org.cloudfoundry.managed-service
  name: test1-service-html5-apps-repo-host
  parameters:
    service: html5-apps-repo
    service-plan: app-host
    service-name: test1-html5-apps-repo-host
```

CONTINUOUS INTEGRATION AND CONTINUOUS DELIVERY PIPELINE FOR LOW CODE AND NO CODE APPLICATION PLATFORM

BACKGROUND

Enterprises use software systems to conduct operations. Example software systems can include, without limitation, enterprise resource management (ERP) systems, customer relationship management (CRM) systems, human capital management (HCM) systems, and the like. In some software systems, processes that underly operations of an enterprise are programmatically defined to enable execution of the processes using the software systems. A workflow can be executed using a set of technologies and tools that enable documents, information, activities and tasks to flow appropriately in enterprise or a department of an enterprise. Applications are developed during design-time in design-time environments and are deployed to runtime environments for production use during runtime.

Lifecycles of applications can include integration and delivery. In some examples, integration can be described as integrating changes to an application and delivery can be described as delivering (or deploying) the changes to the application (e.g., while executing in a production (runtime) environment). So-called continuous integration (CI) and continuous delivery (CD) can be provided through a CI/CD pipeline. CI can be described as a development process, in which developers integrate their respective contributions frequently into a single main line, and, before each integration, the changes are verified through builds and automated testing. CD can be described as expanding on CI in that any changes that successfully pass testing are automatically deployed to the production environment.

Traditional CI/CD pipelines, however, can require administrators and developers to deal with multiple, disparate systems including, for example, development environments, configuration management, source control, and build servers, each of which requires in-depth and specific knowledge on various aspects. Further, traditional CI/CD pipelines can require developers to drill down to the source code level to perform highly technical tasks, such as integration and testing. Performing such tasks, however, is time- and resource-intensive and typically requires highly skilled and experienced developers in multiple disparate technologies. Further, numerous technical resources need to be provisioned, deployed, and consumed for design-time integration and runtime delivery of changes to applications executing in production environments.

SUMMARY

Implementations of the present disclosure are directed to continuous integration (CI)/continuous delivery (CD) pipelines. More particularly, implementations of the present disclosure provide a CI/CD platform that enables developers, such as low-code/no-code (LCNC) developers, to configure CI/CD jobs in a simple and intuitive manner for automated builds of applications in response to change commits.

In some implementations, actions include receiving, through a set of user interfaces (UIs), user input including job configuration information and deployment information for an application, providing a CI/CD job for the application with a CI/CD service using the job configuration information and the deployment information, and triggering, in response to a commit of changes to the application in a repository, automated build of the application, and in response, automatically: generating a development descriptor file at least partially based on the user input, providing an archive file including the development descriptor file, and processing, by the CI/CD job executed by the CI/CD service, the archive file to deploy the application within the target environment. Other implementations of this aspect include corresponding systems, apparatus, and computer programs, configured to perform the actions of the methods, encoded on computer storage devices.

These and other implementations can each optionally include one or more of the following features: actions further include providing a webhook between the repository and the CI/CD service, the webhook providing a webhook push event sent to the CI/CD service to trigger the automated build of the application; the deployment information includes an application programming interface (API) endpoint, an organization name, a space name, and credentials for accessing an application project of the application within the repository; actions further include storing application artifacts of the application as an application project within the repository; the set of UIs is provided by a CI/CD guided development module of an application development platform; the development descriptor file is a manifest file including identification of one or more backend services used to execute CI/CD functionality, dependencies, and details of a process for build and deployment of the application; and the application is a multi-target application (MTA) that can be deployed to multiple, disparate target environments.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to continuous integration (CI)/continuous delivery (CD) pipelines. More particularly, implementations of the present disclosure provide a CI/CD platform that enables developers, such as low-code/no-code (LCNC) developers, to configure CI/CD jobs in a simple and intuitive manner for automated builds of applications in response to change commits.

In some implementations, actions include receiving, through a set of user interfaces (UIs), user input including job configuration information and deployment information for an application, providing a CI/CD job for the application with a CI/CD service using the job configuration information and the deployment information, and triggering, in response to a commit of changes to the application in a repository, automated build of the application, and in response, automatically: generating a development descriptor file at least partially based on the user input, providing an archive file including the development descriptor file, and processing, by the CI/CD job executed by the CI/CD service, the archive file to deploy the application within the target environment.

As used herein, the terms low-code and no-code generally refer to software development platforms and/or tools that are targeted at users with little or no development experience (e.g., referred to as citizen developers, or LCNC developers). Another target of such platforms and/or tools can include more experienced developers having shorter timeframes for development (e.g., LCNC enabling developers to develop more quickly). Here, low-code can refer to development requiring some level of coding experience, while no-code can refer to development with no coding experience. In the context of implementations of the present disclosure, LCNC CI/CD developers generally refers to developers of applications. While the present disclosure references low-code developers and/or no-code developers, collectively LCNC developers or citizen developers, it is appreciated that implementations of the present disclosure can be realized for the benefit of more sophisticated developers.

To provide further context for implementations of the present disclosure, and as introduced above, lifecycles of applications can include integration and delivery of changes (e.g., updates, patches). In some examples, integration can be described as integrating changes to an application and delivery can be described as delivering (or deploying) the changes to the application (e.g., while executing in a production (runtime) environment). Continuous integration (CI) and continuous delivery (CD) can be provided through a CI/CD pipeline. CI can be described as a development process, in which developers integrate their respective contributions (e.g., changes to application code) frequently into a single main line, and, before each integration, the changes are verified through builds and automated testing. CD can be described as expanding on CI in that any changes that successfully pass testing are automatically deployed to the production environment.

Traditional CI/CD pipelines, however, can require administrators and developers to deal with multiple, disparate systems including, for example, development environments, configuration management, source control, and build servers, each of which requires in-depth and specific knowledge on various aspects. Further, traditional CI/CD pipelines can require developers to drill down to the source code level to perform highly technical tasks, such as integration and testing. Performing such tasks, however, is time- and resource-intensive and typically requires highly skilled and experienced developers in multiple disparate technologies. Further, numerous technical resources need to be provisioned, deployed, and consumed for design-time integration and runtime delivery of changes to applications executing in production environments.

In view of the above context, implementations of the present disclosure provide a CI/CD platform that is hosted within a cloud platform that also hosts and executes applications, for which CI/CD functionality is to be provided. In some implementations, the CI/CD platform includes a user-facing frontend and a backend engine. In some examples, the frontend is built into an application studio and provides intuitive and user-friendly user interfaces (UIs) for CI/CD job creation and configuration. In some examples, an application studio can include software or a suite of software that supports development and deployment of applications as well as application lifecycles. In some examples, the backend engine executes the CI/CD pipelines. For example, the backend engine orchestrates and consumes various backend services to provide CI/CD functionality. As described in further detail herein, the CI/CD platform of the present disclosure consolidates the functions of different CI/CD systems into a unified and easy-to-use environment and encapsulates the low-level coding facing tasks into high-level human facing tasks. In this manner, LCNC developers (citizen developers) are relieved from the difficult low-level technical tasks of integration and delivery, empowering LCNC developers to easily perform CI/CD tasks.

Implementations of the present disclosure are described with reference to various entities, at least some of which are provided by SAP SE of Walldorf, Germany. An example entity includes the Business Technology Platform (BTP), which can be described as a platform that brings together data and analytics, artificial intelligence, application development, automation, and integration in a unified environment. Another example entity includes the Cloud Application Programming Model (CAP), which can be described as a framework of languages, libraries, and tools for building enterprise-grade services and applications. Another example entity includes Core Data Services (CDS), which can be described as an infrastructure within CAP that can be used by developers to create an underlying (persistent) data model, which the applications expose to UI clients. In some examples, CDS includes a command line client and development toolkit that is referred to as CDS-DK (or cds-dk). Another example entity includes the Business Application Studio (BAS), which can be described as a cloud-based development tool for building applications.

Another example entity is a multi-target application (MTA), which includes multiple modules (software modules) that share a common lifecycle for development and deployment. In some examples, the modules can be developed using different technologies and languages and can be deployed to different target environments. However, in the context of a MTA, the modules serve respective aspects of a particular purpose for users of the application. As such, a MTA can include a group of modules packaged into a MTA archive along with a MTA deployment descriptor. MTAs can be distributed across multiple containers and target platforms. The MTA approach enables adoption of a common life-cycle process (from development to deployment) for all application artifacts to be deployed to the target platform(s).

Another example entity includes the Cloud MTA Build Tool (MBT), which can be described as a standalone command-line tool that builds a deployment-ready MTA using a respective archive file (e.g., .mtar file) from the artifacts of a MTA project. In some examples, the archive file is built using a development descriptor (mta.yaml file) of the application, which is discussed in further detail herein. In some examples, the development descriptor includes design-time module types that are converted into deployment time module types, when the application is deployed. In some examples, the archive file includes one or more MTA modules and configuration files (e.g., a deployment manifest, a deployment descriptor). Another example entity includes Jenkins, which can be described as a shared library for CI/CD pipelines.

While reference is made herein to the above-discussed entities for purposes of non-limiting illustration, it is contemplated that implementations of the present disclosure can be realized using any appropriate entities.

Figure 1:
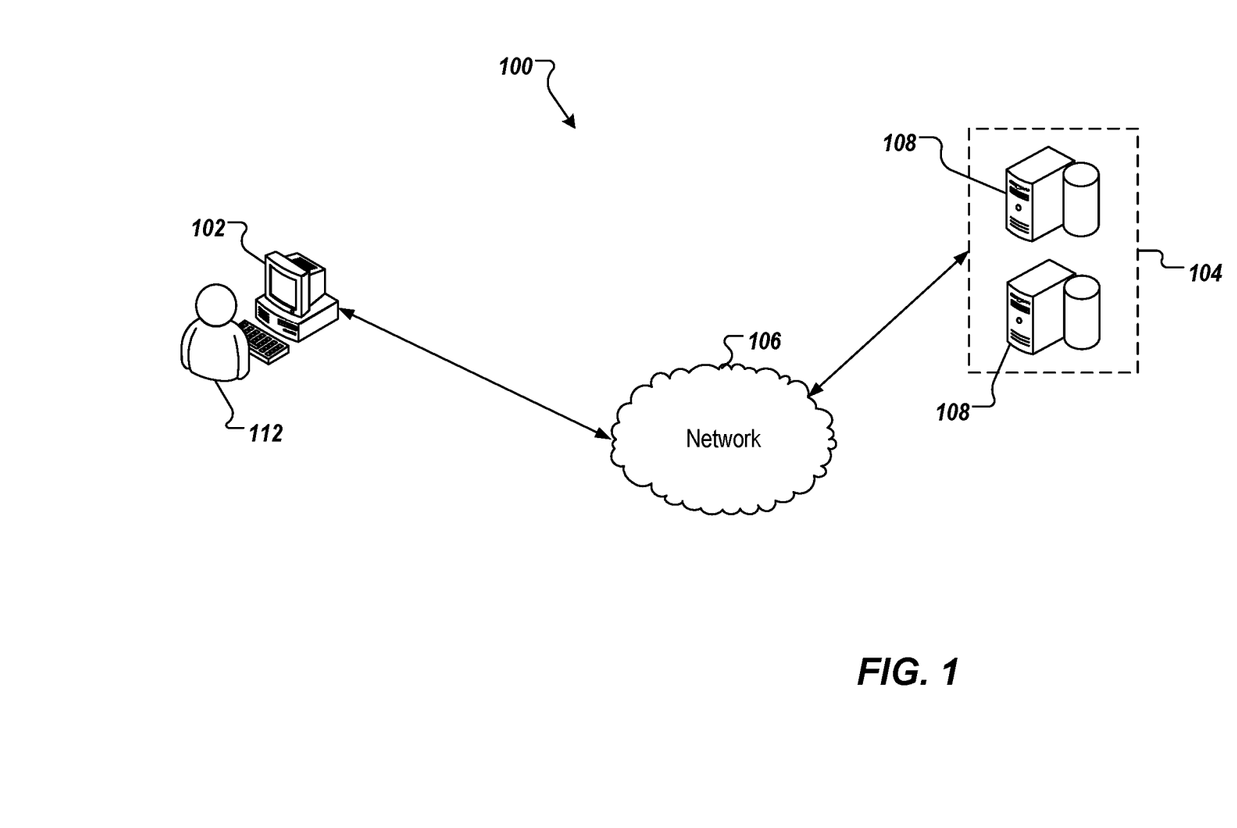
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more cloud-based applications (e.g., MTAs).

In accordance with implementations of the present disclosure, the server system 104 can host a CI/CD platform. As described in further detail herein, the CI/CD platform is hosted within a cloud platform that hosts and executes applications (e.g., MTAs), for which CI/CD functionality is to be provided. In some implementations, the CI/CD platform includes a user-facing frontend and a backend engine. In some examples, the frontend is built into an application studio and provides intuitive and user-friendly UIs for CI/CD pipelines. In some examples, the backend engine executes the CI/CD pipelines. For example, the backend engine orchestrates and consumes various backend services to provide CI/CD functionality. Example backend services include, without limitation, source control, application build, application transport management, application launchpad, and the like.

Figure 2:
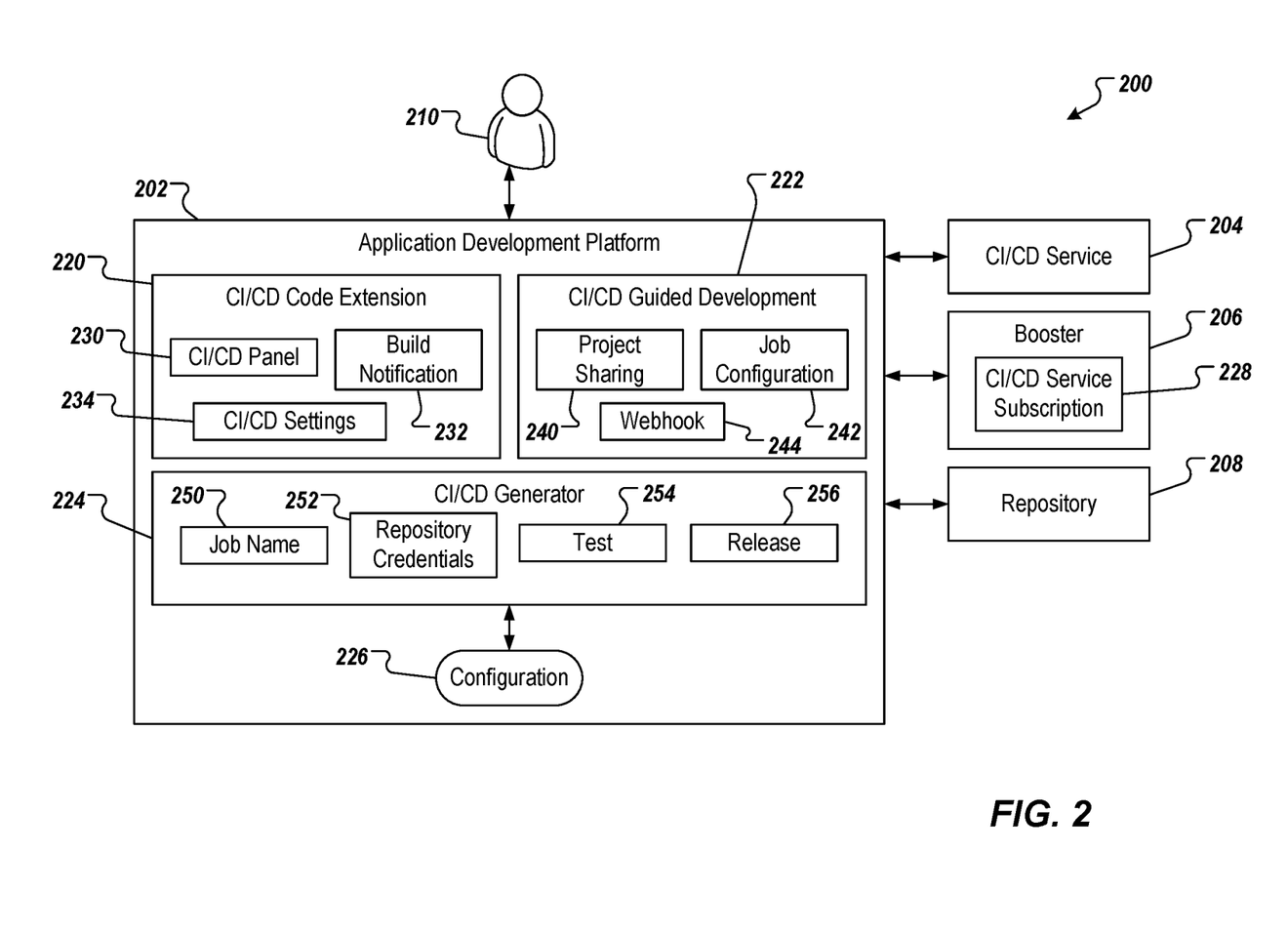
FIG. 2 depicts an example architecture of an application development platform in accordance with implementations of the present disclosure.
Figure 3A:
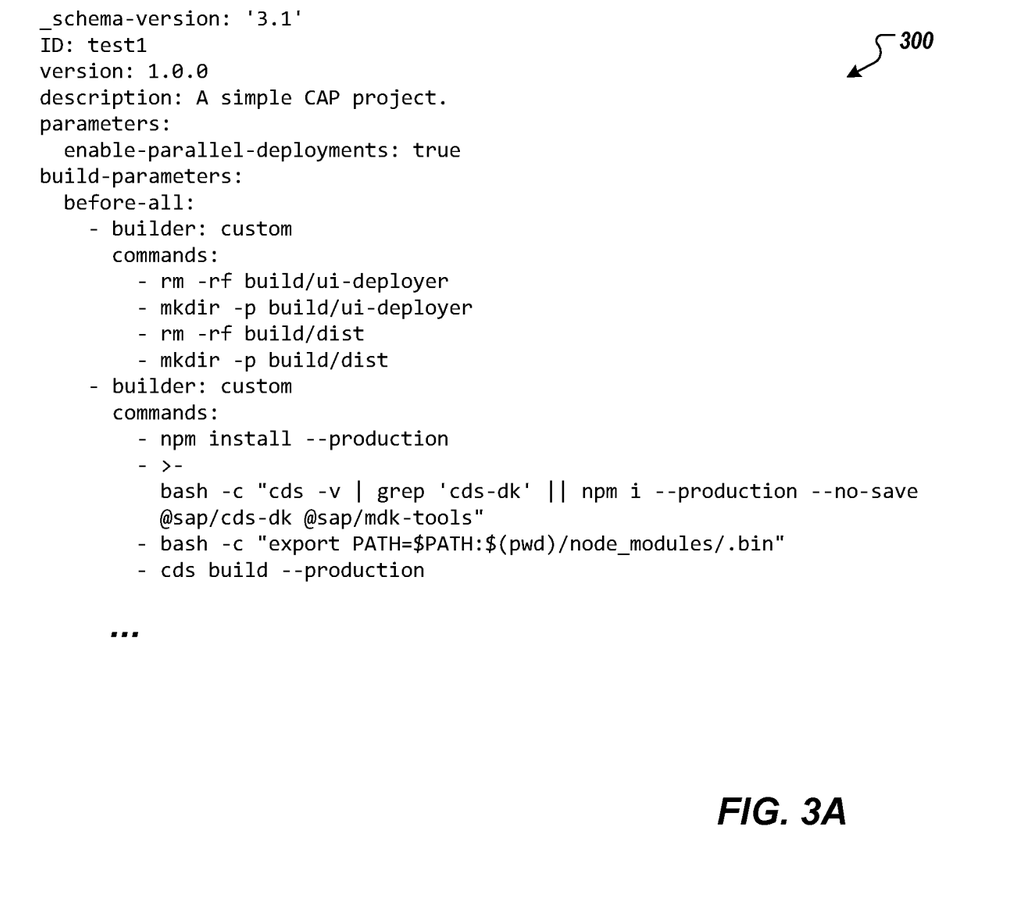
FIGS. 3A-3F collectively depict example content of a manifest file in accordance with implementations of the present disclosure.
Figure 3B:
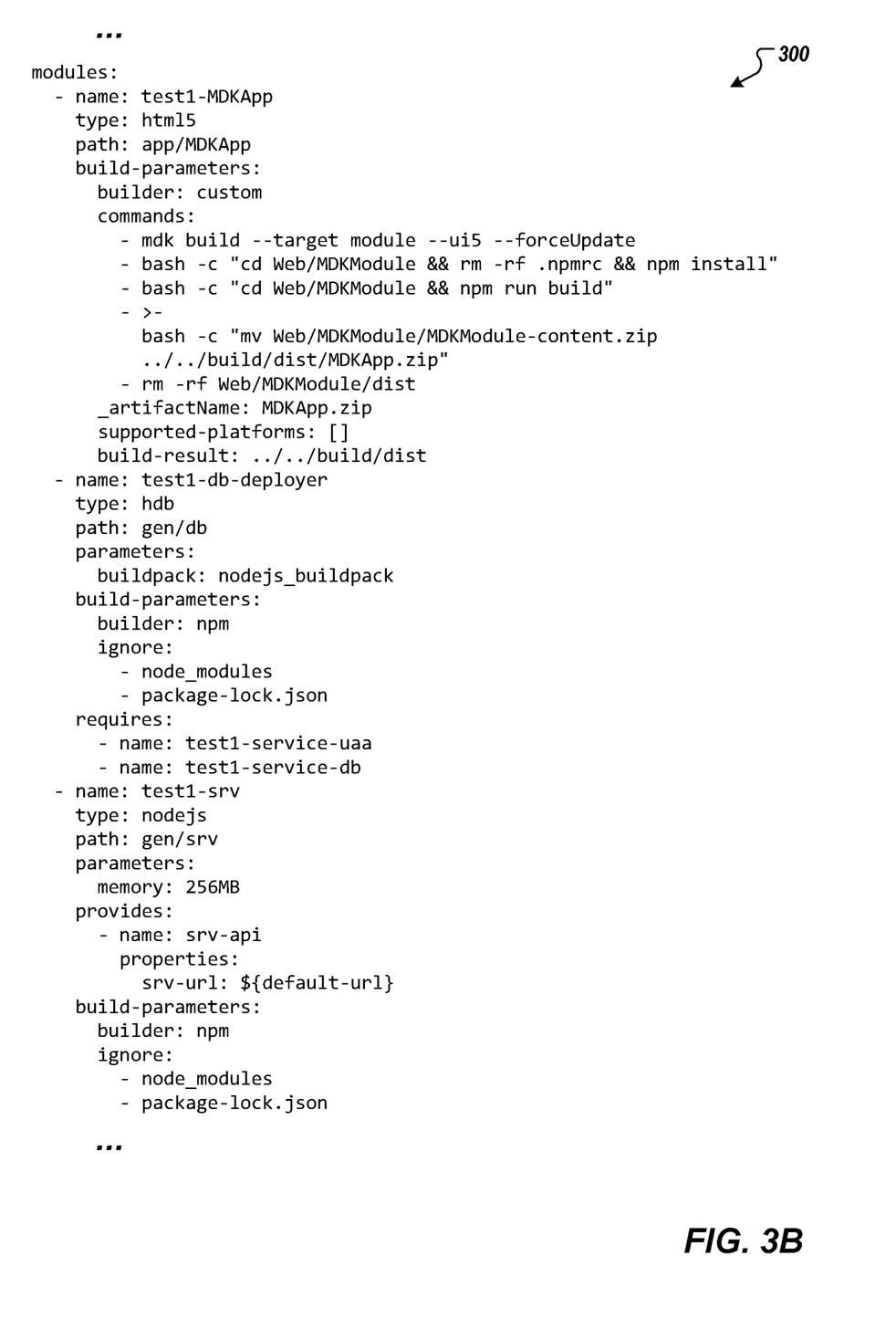
Figure 3C:
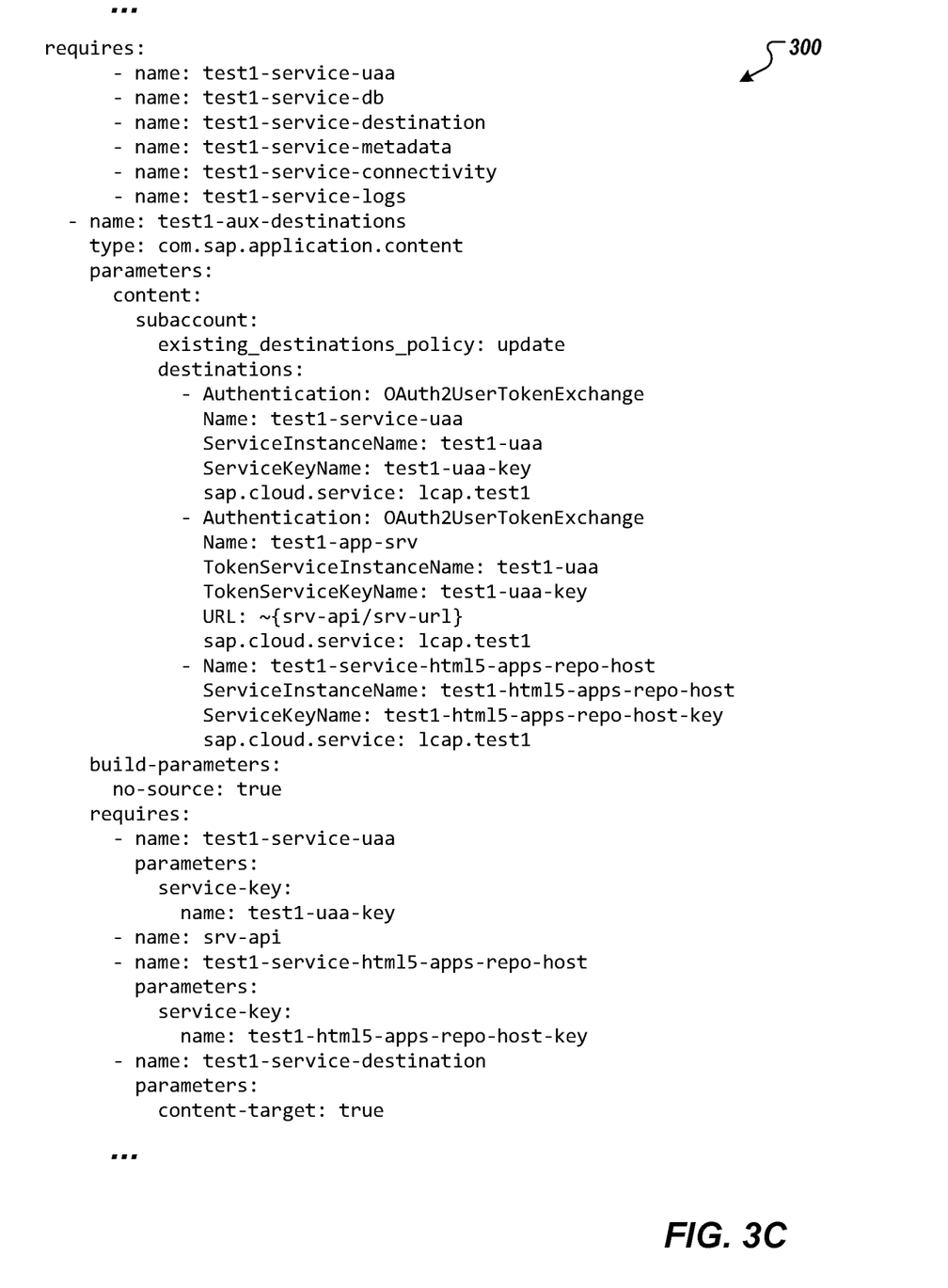
Figure 3D:
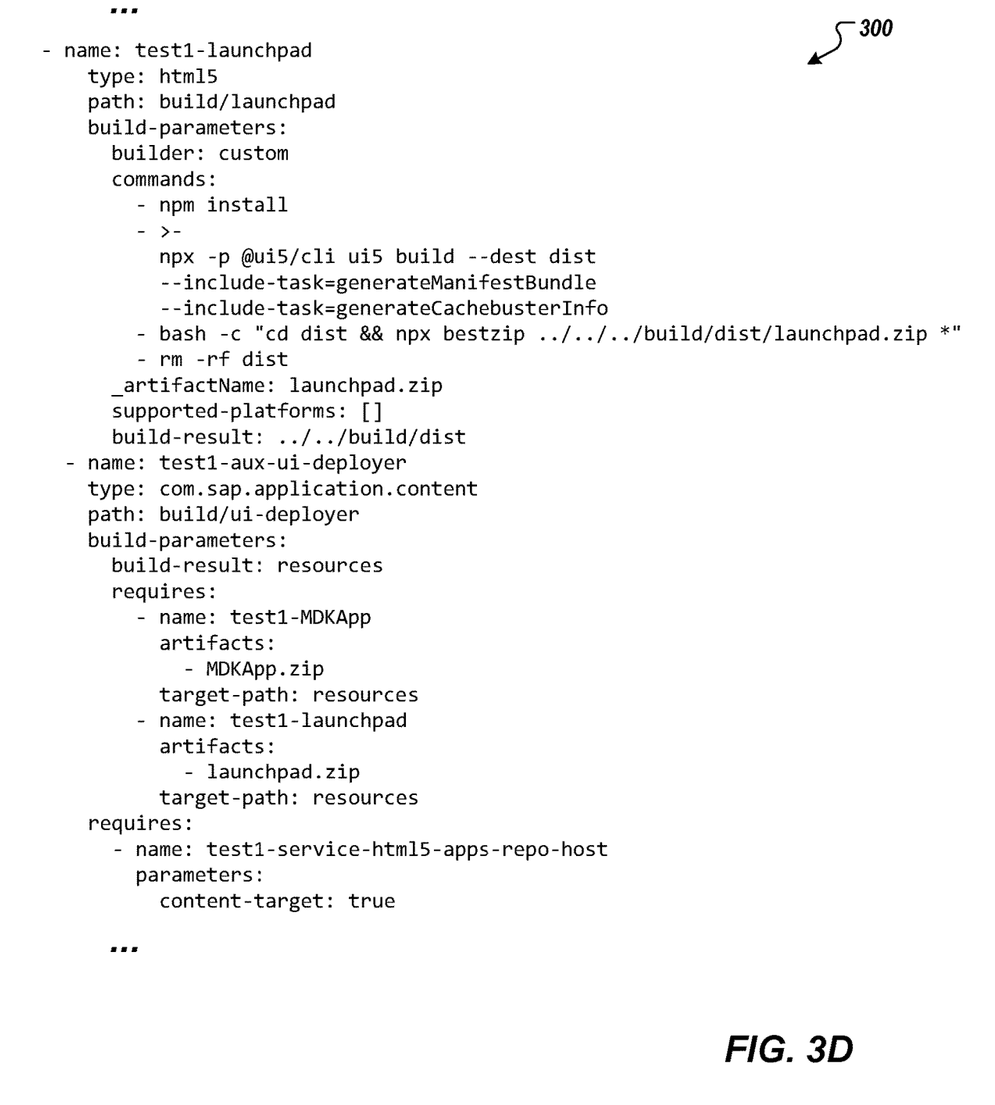
Figure 3E:
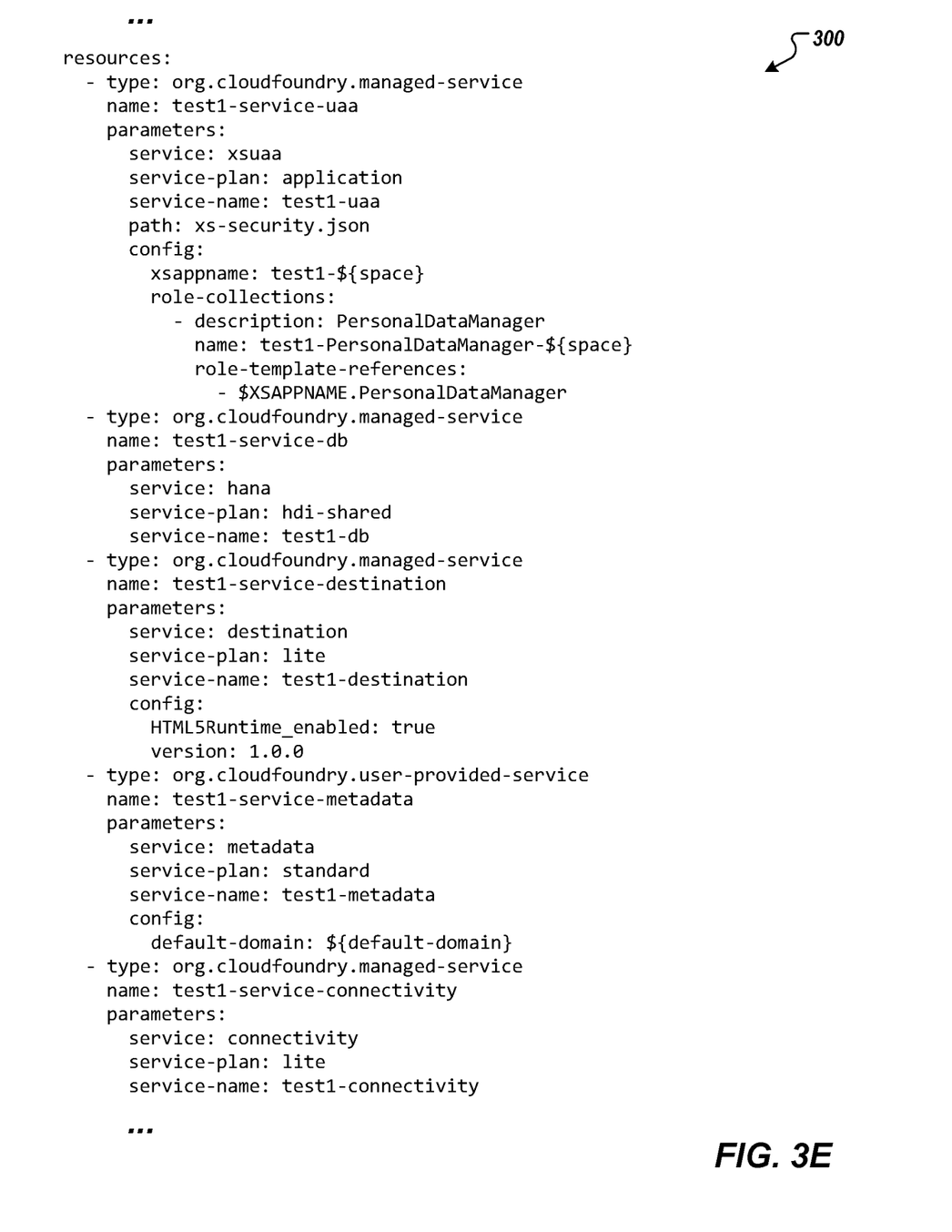
Figure 3F:
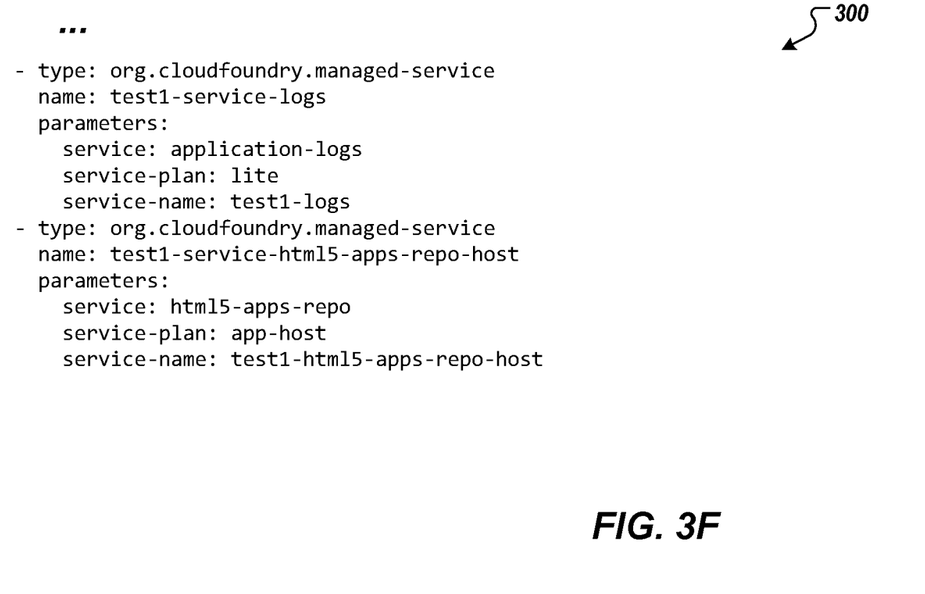

FIG. 2 depicts an example architecture 200 in accordance with implementations of the present disclosure. The example architecture 200 includes an application development platform 202, a CI/CD service 204, a booster 206, and a repository 208. In some examples, the repository 208 can be provided as a so-called git repository (e.g., a central github). In the example of FIG. 2, a developer 210 interacts with the application development platform 202 (e.g., through the client device 102 of FIG. 1). An example application development platform 202 includes, without limitation, the BAS.

In the example of FIG. 2, the application development platform 202 includes a CI/CD code extension module 220, a CI/CD guided development module 222, a CI/CD generator module 224, and a configuration store 226, and the booster 206 includes a CI/CD subscription module 228. In some examples, the CI/CD code extension includes a CI/CD panel sub-module 230, a build notification sub-module 232, and a CI/CD settings sub-module 234. In some examples, the CI/CD guided development module 222 includes a project sharing sub-module 240, a job configuration sub-module 242, and a webhook sub-module 244. In some examples, the CI/CD generator module 224 includes a job name sub-module 250, a repository credentials sub-module 252, a test sub-module 254, and a release sub-module 256.

In some examples, the CI/CD code extension module 220 is an extension component to an integrated development environment (IDE) (e.g., to BAS Web IDE). In some examples, the CI/CD panel sub-module 230 enables a panel of the IDE to render CI/CD content that can support multiple projects. Each project can support multiple CI/CD jobs and, for each CI/CD job, the developer 210 can create, edit, and delete the job, manually trigger a build for the job and go to the CI/CD service 204 (e.g., a cockpit provided by the service) to monitor the progress of a particular build. The build notification sub-module 232 supports a timer that can periodically compare the latest status and previous status of each build, and, if the status is changed, a notification message will be displayed to notify the developer 210 of the change. The CI/CD settings sub-module 234 enables the developer 210 to turn on/off settings, such as the build notification.

In accordance with implementations of the present disclosure, the CI/CD guided development module 222 guides the developer 210 through application development and configuration of CI/CD jobs. For example, the CI/CD guided development module 222 provides a guided wizard using a set of UIs. In some examples, the developer 210 can navigate the guided wizard through the set of UIs to configure CI/CD functionality for an application. In some examples, the set of UIs enable the creation, sharing, and configuration of CI/CD jobs. In some examples, a CI/CD job executes tasks to build and deploy an application to a runtime environment (e.g., a Cloud Foundry environment). For example, the CI/CD job can be executed by the CI/CD service 204 and informs the CI/CD service 204 what is to be executed and when.

In some implementations, a guided development UI enables the developer 210 to create a CI/CD job for an application. The guided development UI includes selections for sharing the to-be-created CI/CD job (e.g., to a repository, such as a git repository), job configuration, and build automation. For example, the guided development UI can include a share interface, a job configuration interface, and a build automation interface.

In some examples, in response to the developer 210 selecting the share interface UI, a repository uniform resource locator (URL) text box is displayed, in which the developer 210 can enter the URL for the project within the repository 208. For example, the project sharing sub-module 240 ingests the URL input by the developer 210 and links the CI/CD job to the project (e.g., application code) within the repository 208. In some examples, in response to the developer 210 selecting the job configuration interface, a set of job configuration UIs is provided. In some examples, the set of job configuration UIs includes a job name UI, a repository credentials UI, and a deployment UI. The job name UI enables the developer 210 to input a job name that is to be assigned to the CI/CD job, the repository credentials UI enables the developer to input credentials (e.g., username, password) for accessing the project within the repository 208, and the deployment UI enables the developer to input deployment information.

The deployment information indicates a space within a cloud-based environment (e.g., a Cloud Foundry space), where the application is to be deployed to and can include, without limitation, an application programming interface (API) endpoint, an organization name, a space name, and credentials (e.g., username, password). In some examples, job configuration information is ingested by the job configuration sub-module 242 and the deployment information is ingested by the webhook sub-module 244. In some examples, a CI/CD job is created using the job configuration information. Example job configuration information can include, without limitation, job name, description, repository (e.g., Github repository), repository credentials, branch, pipeline, retention parameters, and the like. In some examples, the deployment information is used to create a webhook between the repository 208 and the CI/CD service 204. A webhook can be described as a HTTP-based callback function for event-driven communication between APIs and, in the context of the present disclosure, enables automated CI/CD application builds. For example, and as described in further detail herein, a webhook push event is sent to the CI/CD service 204 to trigger a build of the application in response to changes to the application code being committed to the repository 208.

In some implementations, the CI/CD generator 224 generates a manifest file (e.g., a config.yml file) for each CI/CD project. In some examples, the manifest file is populated by the input of the developer 210 to the guided wizard as well as input provided to the visual editor. In some examples, the manifest file contains all information required to execute the CI/CD functionality for the respective application, identifies the backend services used to execute the CI/CD functionality (e.g., the CI/CD service 204) as well as dependencies, and details the process for build and deployment. In some examples, the CI/CD generator 224 generates the manifest file from a shell file that includes multiple placeholders that are then populated with information input by the developer to the guided wizard.

In some examples, the manifest file can be described as a development descriptor that defines elements and dependencies of the application, for which the CI/CD functionality is provided (e.g., the application that is stored in the repository 208). In some examples, the application defined in the manifest file is a MTA, discussed above. Unlike traditional manifest files, the manifest file of the present disclosure enables the application project to be correctly built in multiple, disparate environments including, for example, local preview, local build, and Jenkins build, without the need for manual intervention by developers. That is, traditional manifest files can only build the application project in a predefined environment. If the environment does not meet requirements, it will fail, and a developer needs to install the corresponding dependencies based on the error(s).

FIGS. 3A-3F collectively depict example content 300 of a manifest file (development descriptor) in accordance with implementations of the present disclosure.

The development descriptor (mta.yaml file) of the present disclosure is generated at design time and a deployment descriptor (mtad.yaml file) is created automatically when the application project is built. The deployment descriptor is automatically packaged into the archive file and deployed to the cloud. Developers do not need to directly interact with the deployment descriptor as it is part of the deployment process.

In some examples, the CI/CD service 204 can be described as a service that enables configuration and execution of predefined CI/CD pipelines. An example CI/CD service is provided on the BTP. In some examples, the CI/CD service 204 functions as an automation tool that retrieves the latest state of the repository 208, builds the project, and deploys the project to a cloud-based environment (e.g., Cloud Foundry environment).

In some examples, the booster 206 provides a set of guided interactive steps that enable the developer 210 to select, configure, and consume services (e.g., on the BTP) to achieve a specific technical goal. In some examples, the booster 206 setups various CI/CD modules (e.g., provisioning service instances, creating and configuring user account and creating and assigning role collections, etc.).

Figure 4:
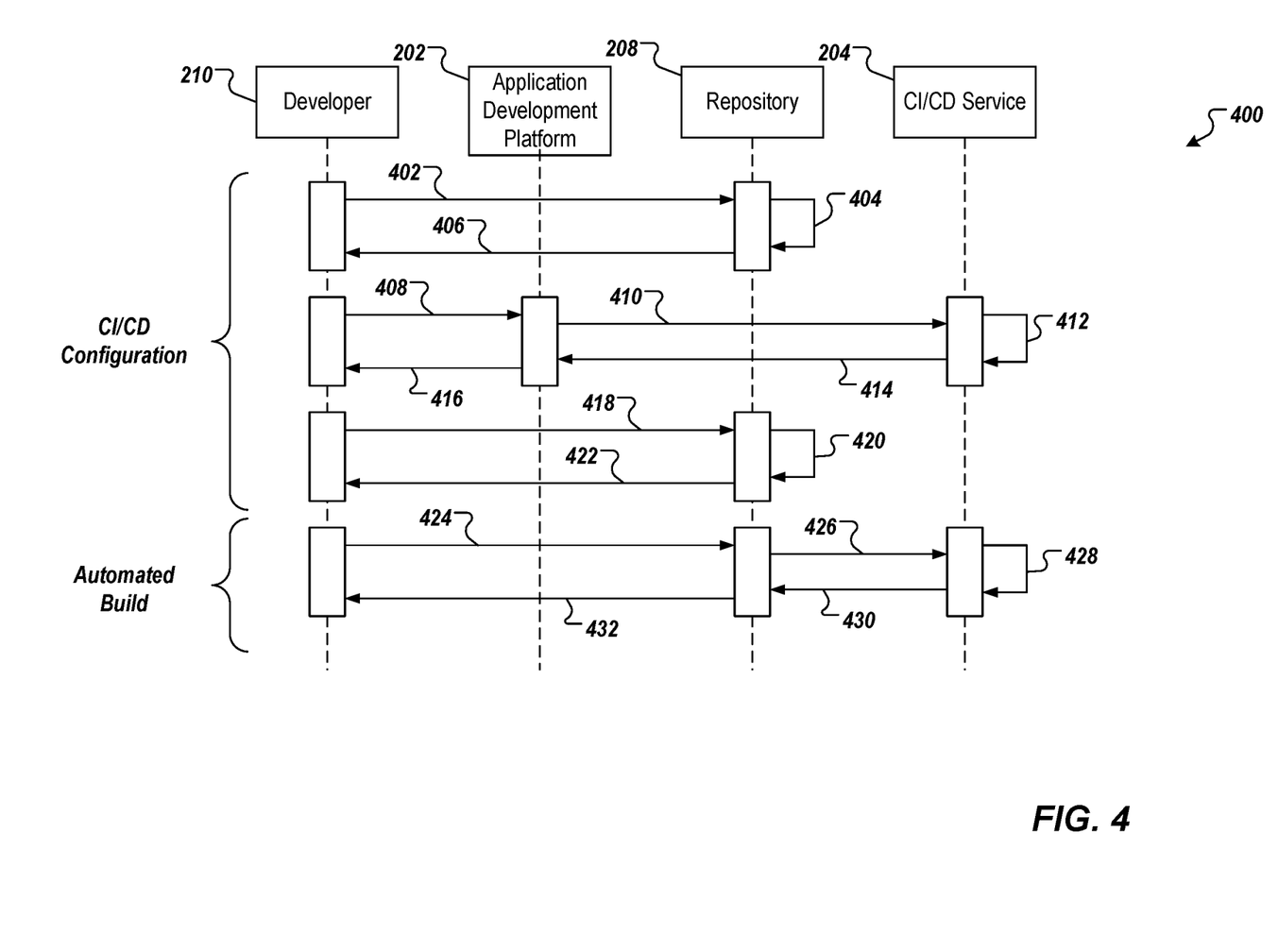
FIG. 4 depicts an example signal flow diagram in accordance with implementations of the present disclosure.

FIG. 4 depicts an example signal flow diagram 400 in accordance with implementations of the present disclosure. In the example of FIG. 4, the example signal flow diagram 400 depicts example interactions between the developer 210, the application development platform 202, the repository 208, and the CI/CD service 204 of FIG. 2.

The developer 210 shares (402) a project to the repository 208. For example, the project is a development project for a MTA that is stored in the repository for subsequent deployment to a target environment (e.g., cloud-based environment). In some examples, the repository 208 stores (404) the project and provides (406) information (e.g., endpoint) to the developer 210. The developer 210 creates (408) a CI/CD job for the project within the application development platform 202. In response, the application development platform 202 creates (410) the CI/CD job with the CI/CD service 204, which registers (412) the CI/CD job. For example, the CI/CD job is created using the job configuration information and the deployment information input by the developer 210 through the set of job configuration UIs. Confirmations of creation of the CI/CD job are sent (414, 416). The developer 210 configures (418) a webhook with the repository 208 for automated build of the application.

The repository 208 registers (420) the webhook for the application and provides (422) confirmation to the developer 210. With the webhook in place, any changes to the application code committed to the repository 208 will trigger automated build of the application through the CI/CD pipeline.

The developer pushes (424) a committal of changes in the application code to the repository 208. In response, the repository 208 triggers a webhook event that is communicated (426) to the CI/CD service 204 to trigger automated build (428) of the application (i.e., based on the changed application code), which can be communicated (430, 432) to the developer 210. In some examples, during the automated build (428), the application development platform 202 can periodically poll the CI/CD service 204 for a status.

Figure 5:
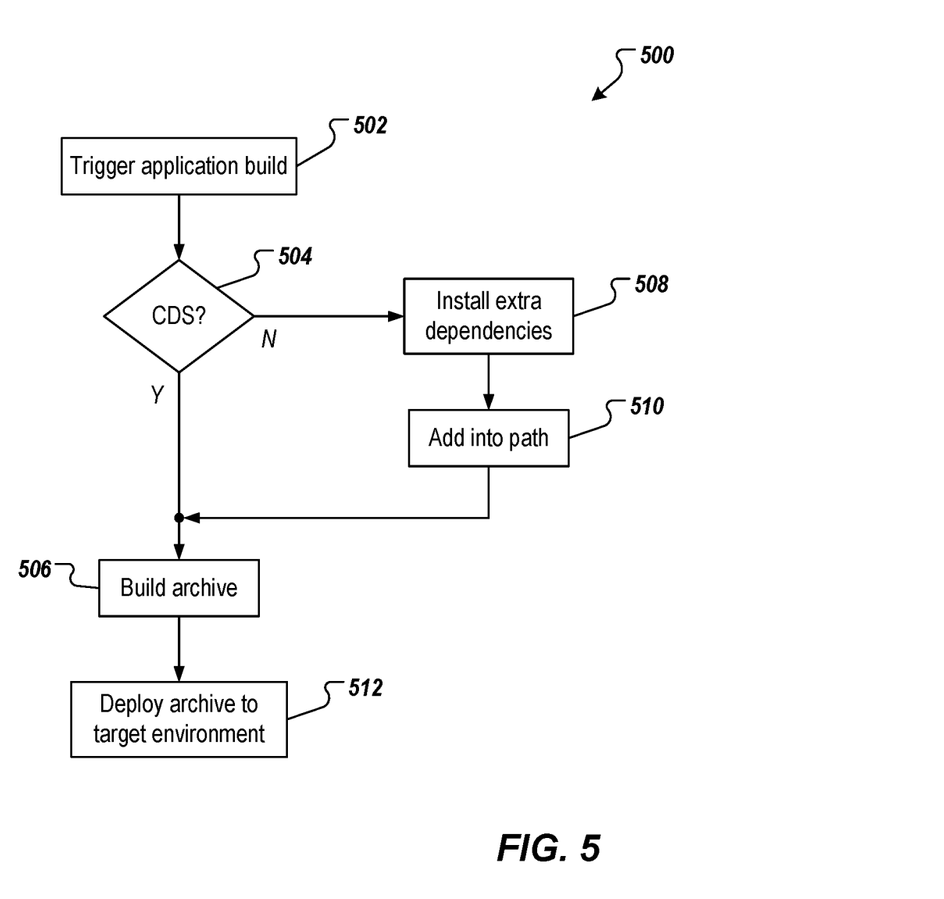
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Build of the application is triggered (502). For example, and as described herein, the developer 210 can push committal of changes in application code to the repository 208. In response, the repository 208 triggers a webhook event that is communicated to the CI/CD service 204 to trigger an automated build of the application (i.e., based on the changed application code). It is determined whether CDS is available (504). For example, and as discussed herein, the deployment descriptor (mta.yaml file) is used to ensure that the application project can be correctly built in different environments. However, particular development toolkits (e.g., @sap/cds-dk) are not installed by default in all development environments. Consequently, a check is performed during the before-all stage to automatically install the development toolkit if it is missing.

If CDS is available, an archive file for the application is built (506). For example, and as described herein, a development descriptor (e.g., mta.yaml file) is automatically generated based on input previously received through the UIs and is included in the archive file that is built. If CDS is not available, extra dependencies are installed (508), dependencies are added into the path (510), and the archive file for the application is built (506). For example, and as noted above, the development descriptor (mta.yaml file) ensures that the current project can be correctly built in different environments. Therefore, during the before-all stage, a check is performed to automatically install any missing dependencies. Adding a dependency to path allows for using shorter command lines to execute the corresponding commands. For example, cds build-production can be called instead of using /home/user/projects/test/node_modules/.bin/cds build-production.

The archive file is deployed to the target environment (512). For example, and as described herein, the archive file is used in the target environment to build the application. In some examples, the MBT builds the deployment-ready MTA using the respective archive file (e.g., .mtar file) from the artifacts of the MTA project.

Figure 6:
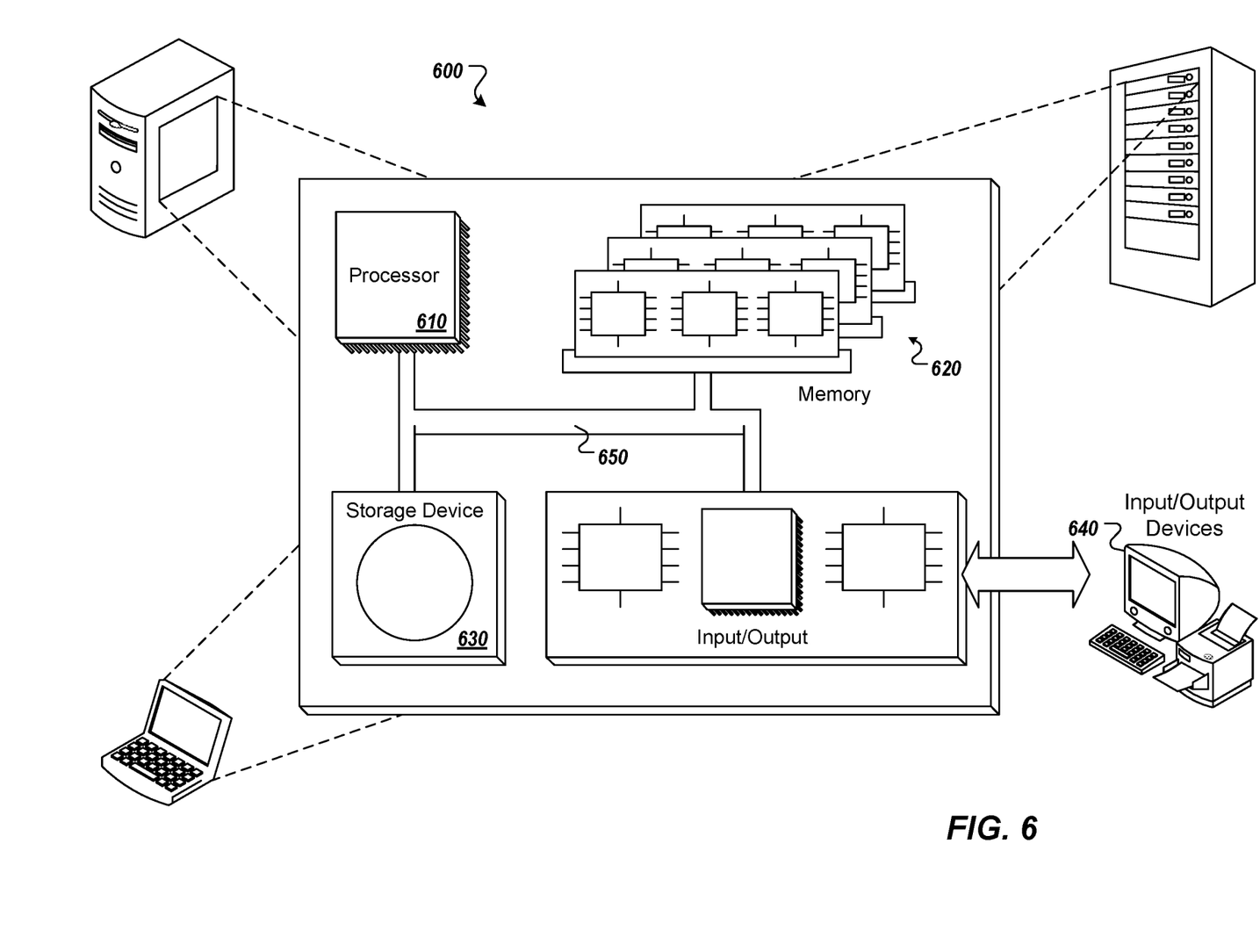
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for low-code/no-code (LCNC) provisioning of continuous integration and continuous delivery (CI/CD) pipelines for deployment of an application to cloud-based environments, the method being executed by one or more processors and comprising:
   receiving, through a set of user interfaces (UIs), user input comprising job configuration information and deployment information for an application;
   providing a CI/CD job for the application with a CI/CD service using the job configuration information and the deployment information; and
   triggering, in response to a commit of changes to the application in a repository, automated build of the application, and in response, automatically:
      generating a development descriptor file at least partially based on the user input,
      providing an archive file comprising the development descriptor file, and
      processing, by the CI/CD job executed by the CI/CD service, the archive file to deploy the application within the target environment.

2. The method of claim 1, further comprising providing a webhook between the repository and the CI/CD service, the webhook providing a webhook push event sent to the CI/CD service to trigger the automated build of the application.

3. The method of claim 1, wherein the deployment information comprises an application programming interface (API) endpoint, an organization name, a space name, and credentials for accessing an application project of the application within the repository.

4. The method of claim 1, further comprising storing application artifacts of the application as an application project within the repository.

5. The method of claim 1, wherein the set of UIs is provided by a CI/CD guided development module of an application development platform.

6. The method of claim 1, wherein the development descriptor file is a manifest file comprising identification of one or more backend services used to execute CI/CD functionality, dependencies, and details of a process for build and deployment of the application.

7. The method of claim 1, wherein the application is a multi-target application (MTA) that can be deployed to multiple, disparate target environments.

8. A non-transitory computer-readable storage medium coupled to one or more processors and having instructions stored thereon which, when executed by the one or more processors, cause the one or more processors to perform operations for low-code/no-code (LCNC) provisioning of continuous integration and continuous delivery (CI/CD) pipelines for deployment of applications to cloud-based environments, the operations comprising:
   receiving, through a set of user interfaces (UIs), user input comprising job configuration information and deployment information for an application;
   providing a CI/CD job for the application with a CI/CD service using the job configuration information and the deployment information; and
   triggering, in response to a commit of changes to the application in a repository, automated build of the application, and in response, automatically:
      generating a development descriptor file at least partially based on the user input,
      providing an archive file comprising the development descriptor file, and
      processing, by the CI/CD job executed by the CI/CD service, the archive file to deploy the application within the target environment.

9. The non-transitory computer-readable storage medium of claim 8, wherein operations further comprise providing a webhook between the repository and the CI/CD service, the webhook providing a webhook push event sent to the CI/CD service to trigger the automated build of the application.

10. The non-transitory computer-readable storage medium of claim 8, wherein the deployment information comprises an application programming interface (API) endpoint, an organization name, a space name, and credentials for accessing an application project of the application within the repository.

11. The non-transitory computer-readable storage medium of claim 8, wherein operations further comprise storing application artifacts of the application as an application project within the repository.

12. The non-transitory computer-readable storage medium of claim 8, wherein the set of UIs is provided by a CI/CD guided development module of an application development platform.

13. The non-transitory computer-readable storage medium of claim 8, wherein the development descriptor file is a manifest file comprising identification of one or more backend services used to execute CI/CD functionality, dependencies, and details of a process for build and deployment of the application.

14. The non-transitory computer-readable storage medium of claim 8, wherein the application is a multi-target application (MTA) that can be deployed to multiple, disparate target environments.

15. A system, comprising:
a computing device; and
a computer-readable storage device coupled to the computing device and having instructions stored thereon which, when executed by the computing device, cause the computing device to perform operations for low-code/no-code (LCNC) provisioning of continuous integration and continuous delivery (CI/CD) pipelines for deployment of applications to cloud-based environments, the operations comprising:
 receiving, through a set of user interfaces (UIs), user input comprising job configuration information and deployment information for an application;
 providing a CI/CD job for the application with a CI/CD service using the job configuration information and the deployment information; and
 triggering, in response to a commit of changes to the application in a repository, automated build of the application, and in response, automatically:
  generating a development descriptor file at least partially based on the user input,
  providing an archive file comprising the development descriptor file, and
  processing, by the CI/CD job executed by the CI/CD service, the archive file to deploy the application within the target environment.

16. The system of claim 15, wherein operations further comprise providing a webhook between the repository and the CI/CD service, the webhook providing a webhook push event sent to the CI/CD service to trigger the automated build of the application.

17. The system of claim 15, wherein the deployment information comprises an application programming interface (API) endpoint, an organization name, a space name, and credentials for accessing an application project of the application within the repository.

18. The system of claim 15, wherein operations further comprise storing application artifacts of the application as an application project within the repository.

19. The system of claim 15, wherein the set of UIs is provided by a CI/CD guided development module of an application development platform.

20. The system of claim 15, wherein the development descriptor file is a manifest file comprising identification of one or more backend services used to execute CI/CD functionality, dependencies, and details of a process for build and deployment of the application.

* * * * *